UNITED STATES PATENT OFFICE.

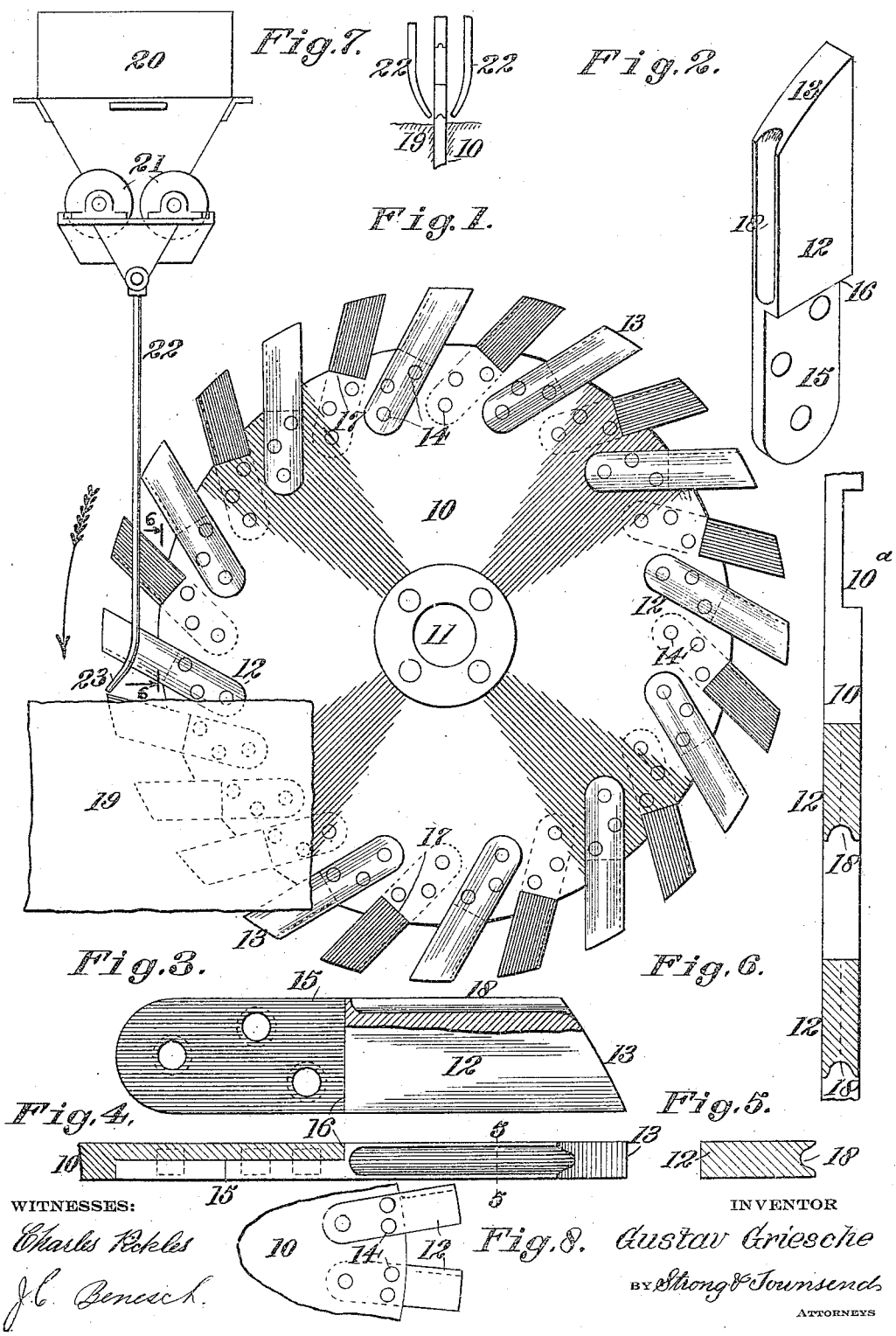

GUSTAV GRIESCHE, OF BERKELEY, CALIFORNIA.

GRANITE AND STONE SAW.

1,256,685.  Specification of Letters Patent.  Patented Feb. 19, 1918.

Application filed October 8, 1917. Serial No. 195,409.

*To all whom it may concern:*

Be it known that I, GUSTAV GRIESCHE, a citizen of the United States, residing at Berkeley, in the county of Alameda and State of California, have invented new and useful Improvements in Granite and Stone Saws, of which the following is a specification.

This invention relates to saws for cutting granite, stone, and the like.

I have heretofore patented several forms of saws for this purpose, all of them operating upon the principle of abrasion, that is, abrasive material such as fine metallic shot is fed to radial pockets formed in a rotatable disk and thrown outwardly by centrifugal force to act upon the stone. In the present invention I have made several changes in the construction of the saw to effect an improved operation. Among them is the employment of detachable teeth on the saw blade, inclined rearwardly from a true radial line and each formed with a longitudinal pocket in its front edge to receive the abrasive material and discharge the same into the kerf of the stone being sawed. Alternate teeth, preferably, are on one side of the saw blade and intermediate teeth on the other side, but the teeth are so recessed or jogged as to bring their inner side faces into the same plane.

One form which my invention may assume is exemplified in the following description and illustrated in the accompanying drawings, in which—

Figure 1 shows a side elevation of a device embodying my invention.

Fig. 2 shows a perspective view of one of the teeth.

Fig. 3 shows a side elevation, partly in section, of a tooth.

Fig. 4 shows an edge view of a tooth secured in place on the saw blade.

Fig. 5 shows a cross sectional view, taken on the line 5—5 of Fig. 4.

Fig. 6 shows a sectional view, taken on the line 6—6 of Fig. 1.

Fig. 7 shows a detail of the mechanism for feeding abrasive material to the saw.

Fig. 8 shows a modified arrangement, wherein the teeth have their longitudinal axes coincident with the radial lines of the disk.

I have shown a saw having its body portion formed of a disk 10, rotatably mounted upon central journals 11 and provided at its periphery with a set of teeth, each comprising a flat metallic member 12 having parallel longitudinal edges and a tapered or inclined outer end 13 formed on a curve. The teeth are so set on the disk as to incline rearwardly from a true radial line, with the longer edges of the teeth disposed at the rear and the curved outer ends terminating in a plane coincident with a circle struck from the center of the disk.

The teeth are detachably secured in place on the disk by means of rivets 14. Alternate teeth are arranged on one side of the disk and intermediate teeth on the other in countersinks 10$^a$, and at the inner portion of the teeth where they fit into the countersinks they are recessed, as shown at 15, the shoulders 16 being preferably at right angles to the longitudinal edges of the teeth and the edges of the disk being notched, as shown at 17, to provide a contacting ledge therefor. Each tooth is provided with a longitudinal, semi-circular groove 18 on its front edge extending from the outer end of the tooth to a point near the periphery of the disk. As will be seen in Fig. 6, the recessing and countersinking of the teeth causes their side faces to lie flush with the sides of the disk and brings the grooves 18 of adjacent teeth into the same plane.

The disk is driven at high peripheral speed in the direction of the arrow shown in Fig. 1, and the saw operates upon a stone or granite block positioned as shown at 19. Suitable means are provided for feeding abrasive material, such as fine metallic shot, to the grooves in the teeth, which mechanism may be such as is shown in my co-pending application Serial Number 154,705, filed March 14th, 1917, which, in general, includes a hopper 20, feed rolls 21 and a pair of conduits 22, the latter having curved nozzles 23 terminating at a point above the kerf in the stone being cut.

In operation, a quantity of shot is discharged into the kerf by the feeding mechanism in front of each tooth, and the latter meeting the same with its grooved edge drives the shot downwardly and outwardly against the stone, the cutting being accomplished entirely by the action of the abrasive material upon the stone under the impetus imparted thereto by the teeth. The rearward incline of the teeth serves to impart a more forceful outward movement to the abrasive material than would be possible if the teeth were arranged on true radial lines. The central position of the grooves on the teeth insures that the shot will not escape laterally and the adjacent teeth lying in the same plane coöperate to a better extent than in the prior structures. Each tooth being detachable is quickly removed and replaced when worn or broken.

It is manifest that the teeth of the present saw, inclined rearwardly as they are and provided with central pockets, will give a greater impetus to the shot in a radially outward direction than the grooves employed in the devices shown in the prior patents.

It is recognized that the teeth may be arranged with their longitudinal axes coincident with the radial lines of the disk, as shown in Fig. 8, and still operate. In such a case the advantages of detachable teeth with central longitudinal grooves in their front edges would still be retained. I therefore, claim the same as a part of my invention.

Various changes in the construction and arrangement of the several parts herein shown and described may be made without departing from the spirit of my invention as disclosed in the appended claims.

Having thus described my invention, what I claim and desire to secure by Letters Patent is—

1. The combination in a stone saw, of a disk, independent teeth fixed to the periphery of the disk in lines which are tangent to a circle within the disk and having their outer ends concentric with the periphery of the disk, and grooved channels formed in the front edges of the teeth between their outer ends and the disk periphery.

2. A stone saw including a disk having independent parallel sided teeth fixed to the disk, said teeth having grooved feed channels formed in their forward edges exteriorly to and in the plane of the disk to direct abrasive material to the saw kerf.

3. A stone saw including a disk having countersunk, diagonally disposed depressions formed alternately upon opposite sides, parallel sided teeth having a portion fitting the depressions of the disk, a portion extending outside the disk and made thicker and having a shoulder adapted to abut against the disk edge, and direction channels formed in the teeth front between the disk and the end of the teeth.

4. A stone saw including a disk having diagonally disposed countersunk recesses made alternately upon opposite sides, parallel sided teeth having a portion fitting the recesses, notches in the periphery of the disk, and shoulders on the teeth fitting said notches and forming a thicker continuation of the teeth exteriorly to the disk edge.

In testimony whereof I have hereunto set my hand in the presence of two subscribing witnesses.

GUSTAV GRIESCHE.

Witnesses:
W. W. HEALEY,
M. E. EWING.

Copies of this patent may be obtained for five cents each, by addressing the "Commissioner of Patents, Washington, D. C."